United States Patent
Decuir

(10) Patent No.: US 6,792,909 B1
(45) Date of Patent: Sep. 21, 2004

(54) CRANKSHAFT WITH VIBRATION DAMPENERS FOR INTERNAL COMBUSTION ENGINES

(75) Inventor: Alex Decuir, Pinon Hills, CA (US)

(73) Assignee: Decuir Engine Technologies, LLC., Los Angeles, CA (US)

( * ) Notice: Subject to any disclaimer, the term of this patent is extended or adjusted under 35 U.S.C. 154(b) by 0 days.

(21) Appl. No.: 10/383,535

(22) Filed: Mar. 10, 2003

(51) Int. Cl.[7] .............................................. F02B 75/06
(52) U.S. Cl. ..................................................... 123/192.1
(58) Field of Search ............................ 123/192.1, 192.2

(56) References Cited

U.S. PATENT DOCUMENTS

| | | |
|---|---|---|
| 538,722 A | 5/1895 | Biedermann |
| 1,367,478 A | 2/1921 | Hapgood |
| 2,064,086 A | 12/1936 | Short et al. |
| 3,188,152 A | 6/1965 | Miller |
| 3,390,925 A | 7/1968 | Fangman |
| 4,114,961 A | 9/1978 | Pithie |
| 4,254,743 A | 3/1981 | Reid et al. |
| 4,362,341 A | 12/1982 | Matsumoto et al. |
| 4,461,585 A | 7/1984 | Mahrus et al. |
| 4,617,884 A | 10/1986 | Allen et al. |
| 4,926,810 A | 5/1990 | Diehl et al. |
| 5,517,957 A | 5/1996 | Wagner et al. |
| 6,044,818 A | 4/2000 | Decuir |

FOREIGN PATENT DOCUMENTS

| | | |
|---|---|---|
| DE | 3813223 | 11/1989 |
| GB | 882299 | 11/1961 |
| JP | 08261233 | 10/1996 |

Primary Examiner—Noah P. Kamen
(74) Attorney, Agent, or Firm—Liniak, Berenato & White

(57) ABSTRACT

A crankshaft includes a plurality of main journals adapted for rotatably supporting the crankshaft by a cylinder block of an engine and a plurality of rod journals rotatably mounted to connecting rods, and a vibration dampener assembly comprising a pair of substantially annular vibration dampener members mounted to each of the rod journals and main journals of the crankshaft thereby dampening a transmission of vibrations between the crankshaft and the connecting rods and the cylinder block. Each of the main journals and rod journals are provided with a pair of axially spaced, substantially annular recessed portions provided for receiving the annular vibration dampener members. Each of the vibration dampener member is preferably made of an oil resistant elastomeric rubber-like material.

21 Claims, 10 Drawing Sheets

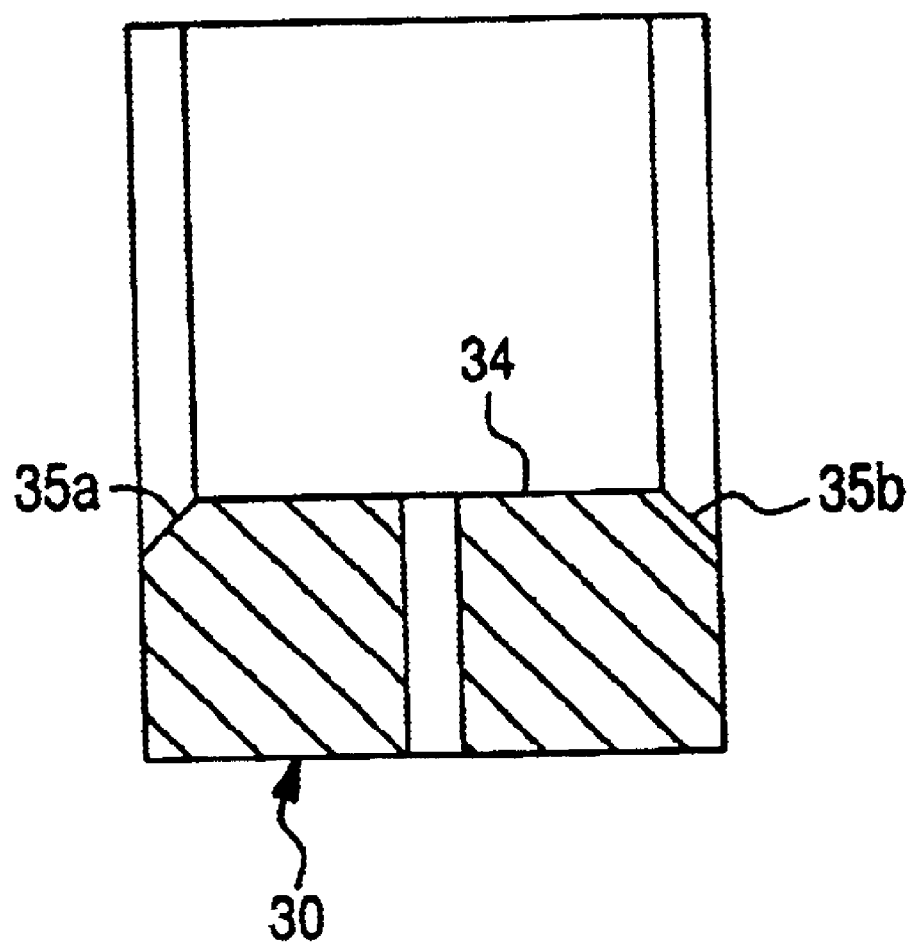

CRANKSHAFT WITH VIBRATION DAMPENERS FOR INTERNAL COMBUSTION ENGINES

BACKGROUND OF THE INVENTION

1. Field of the Invention

The present invention relates to absorption/isolation of vibrations in internal combustion engines, and is more particularly directed to crankshaft provided with vibration dampening members for absorbing/isolating vibrations between a crankshaft and a connecting rod and/or a cylinder block of an internal combustion engine.

2. Description of the Prior Art

In the conventional multi-piston type internal combustion engine the pistons are coupled to a crank shaft by connecting rods to translate the reciprocating motion of the pistons to the rotary motion of the crankshaft. Explosions in the combustion engine create vibrations which are transmitted to the connecting rods and from the connecting rods to the crankshaft to a cylinder block. These vibrations increase in force and frequency in high speed engines.

Conventionally, the connecting rods which house rod bearings are separated from a rod journal by a thin layer of lubricating oil. Similarly, the sides of the connecting rod are bathed in lubricating oil preventing contact with the crankshaft. Because of the relative incompressibility of this oil layer, vibrations are easily transmitted from the connecting rod/bearing assembly to the crankshaft and from the crankshaft to the cylinder block causing maintenance problems and wearing and tearing the engine.

In order to alleviate this problem, prior art engines incorporate various vibration dampening devices. However, most of the vibration dampening devices of the prior art suffer from the drawback that they are located far from the source of the vibrations.

Therefore, there is a need for a vibration absorbing/isolating device for an internal combustion engine located close to the source of the vibrations to alleviate most of the drawbacks of the prior art in a simple, efficient and inexpensive manner.

SUMMARY OF THE INVENTION

The present invention provides a vibration dampener assembly provided to isolate vibrations between connecting rods and a crankshaft and/or between a crankshaft and a cylinder block of an internal combustion engine and prevent/reduce vibrations from being transmitted to the crankshaft and/or to the cylinder block and, consequently, to remaining portions of a drive train assembly.

The internal combustion engine in accordance with the present invention comprises the crankshaft having at least one rod journal and at least one main journal, the cylinder block including at least one crankshaft support member rotatably supporting the at least one main journal the crankshaft, and at least one connecting rod rotatably coupled to the at least one rod journal of the crankshaft. Preferably, the internal combustion engine in accordance with the preferred embodiment of the present invention comprises the crankshaft having a plurality of the rod journal and a plurality of the main journal, a plurality of the crankshaft support members and a plurality of the connecting rods.

Each of the crankshaft support member comprises a main bearing portion, which may be integrally formed within the engine block, and a main bearing cap connected to the corresponding main bearing portion to circumscribe the main journal of the crankshaft through semi-cylindrical main bearings. Moreover, each of the crankshaft support members has a main bore defined by an inner wall of the main bearing portions disposed between two axially opposite chamfered ends and a complementary inner wall of the main bearing cap also disposed between two axially opposite chamfered ends.

Each of the connecting rods in accordance with the present invention, has a split first end adapted for holding the rod journal of the crankshaft and connecting rod bearings, and a second end defining a pin opening provided to receive a piston pin. The first end has a crank bore adapted for receiving the rod journal of the crankshaft and the connecting rod bearings, and defined by an annular, substantially cylindrical inner wall disposed between two axially opposite chamfered ends.

In order to effectively reduce and eliminate the transmission of vibration and its harmonics from the connecting rod to the crankshaft and/or from the crankshaft to the cylinder block, a vibration dampener assembly is disposed between the connecting rod and the crankshaft and/or between the crankshaft and the cylinder block.

The vibration dampener assembly in accordance with the preferred exemplary embodiment of the present invention comprises a pair of substantially annular recessed portions formed in an outer peripheral surface of each of the rod journals of the crankshaft, a pair of axially spaced, opposite, substantially annular recessed portions formed in the outer peripheral surface of each of the main journal of the crankshaft, and a plurality of a pair of complementary, substantially annular vibration dampener members each pair disposed in the corresponding, annular recessed portions formed in the journal bearings and the main bearings of the crankshaft respectively, for thereby dampening a transmission of vibrations between the crankshaft and the connecting rods and between the crankshaft and the cylinder block. Alternatively, any appropriate number of the annular vibration dampener members may be mounted to the rod journals and the main journals of the crankshaft. Preferably, the annular recessed portions are formed on the axially opposite end sides of the rod journal adjacent to the counterweights. Similarly preferably, the annular recessed portions are formed on the axially opposite end sides of the main journal adjacent to the counterweights.

Preferably, the vibration dampener members mounted to the rod journals of the crankshaft slightly extend from the recessed portions in the rod journals of the crankshaft so that the vibration dampener members are in contact and somewhat compressed by the chamfered ends of the crank bore of the connecting rod, thus significantly dampening a transmission of vibrations from the connecting rod to the crankshaft. Similarly preferably, the vibration dampener members mounted to the main journals of the crankshaft slightly extend from the recessed portions in the main journals of the crankshaft so that the vibration dampener members are in contact and somewhat compressed by the chamfered ends of the main bearing blocks and the main bearing caps, thus significantly dampening a transmission of vibrations from the crankshaft to the cylinder block.

Preferably, the two pairs of vibration dampener members together form O-ring-like rings and have substantially circular cross-section. Correspondingly, the semi-annular recessed portions have substantially semi-circular cross-sections substantially complementary to the cross-sections of the vibration dampener members. Further preferably, the vibration dampener members are made of a slippery elastomeric oil resistant rubber-like material.

Moreover, previously manufactured internal combustion engines having conventional crankshafts, may be easily retrofitted with the crankshafts of the present invention.

Those skilled in the art will also understand that the crankshaft of the present invention can be used in many different types of mechanisms, other than the internal combustion engines, employing the connecting rod/crankshaft combination, such as piston pumps, pneumatic or hydraulic piston actuators, etc.

Therefore, the present invention provides a simple and inexpensive vibration dampener arrangement for isolating/reducing the engine vibrations at their source, i.e. between the connecting rods and the crankshaft, before they are transmitted through the crankshaft to the other components of the engine, and between the connecting rod and the cylinder block, and prevent/reduce the vibrations from being transmitted to the crankshaft and/or to the cylinder block and consequently to the remaining portions of the drive train assembly.

BRIEF DESCRIPTION OF THE DRAWINGS

Other objects and advantages of the invention will become apparent from a study of the following specification when viewed in light of the accompanying drawings, wherein:

FIG. 5 is a cross-sectional view of the main bearing cap according to the preferred exemplary embodiment of the present invention;

DETAILED DESCRIPTION OF PREFERRED EMBODIMENTS

The preferred embodiments of the present invention will now be described with the reference to accompanying drawings.

Figure 1:
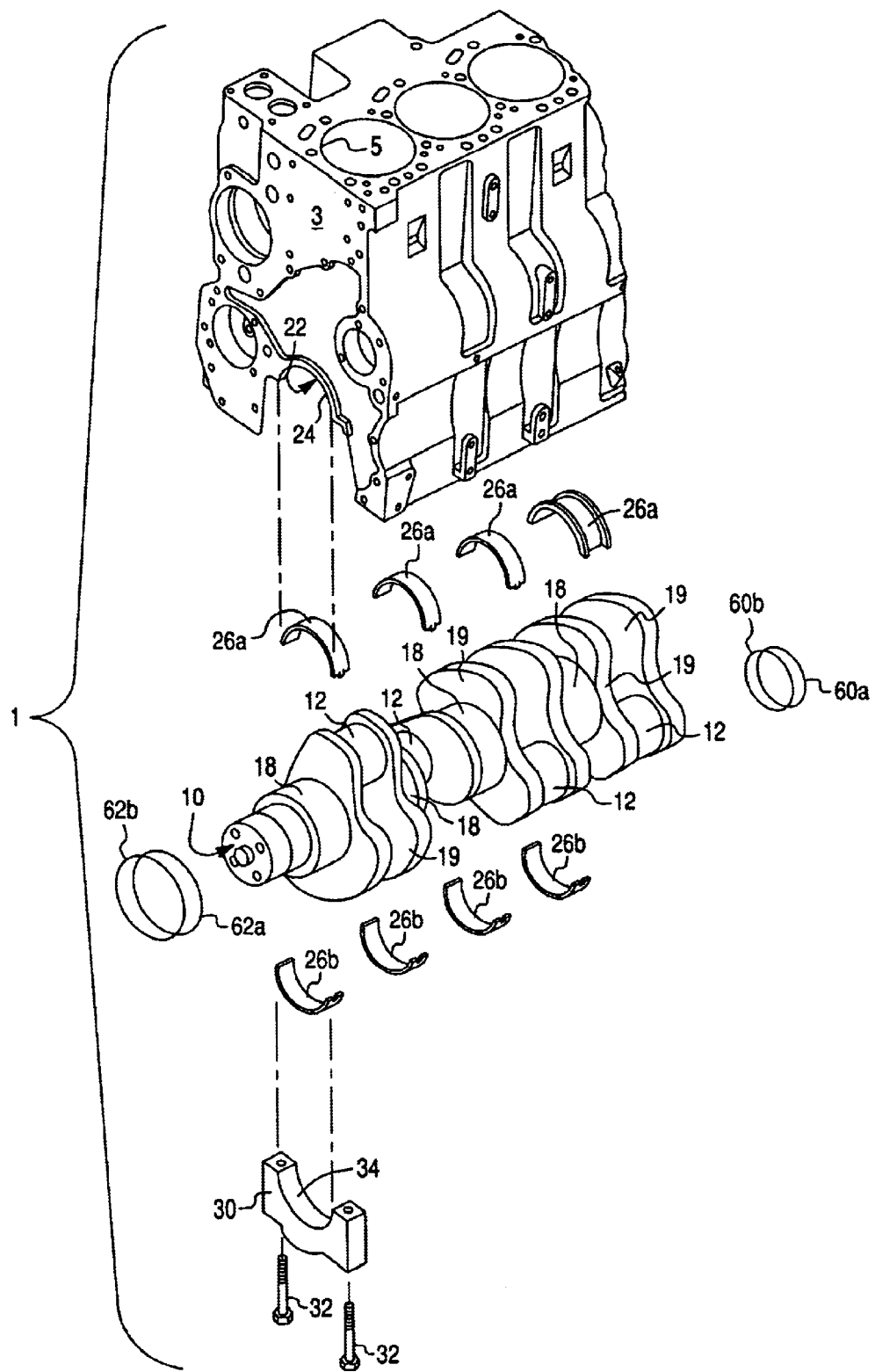
FIG. 1 is a partial exploded view of an internal combustion engine according to the preferred exemplary embodiment of the present invention.
Figure 2:
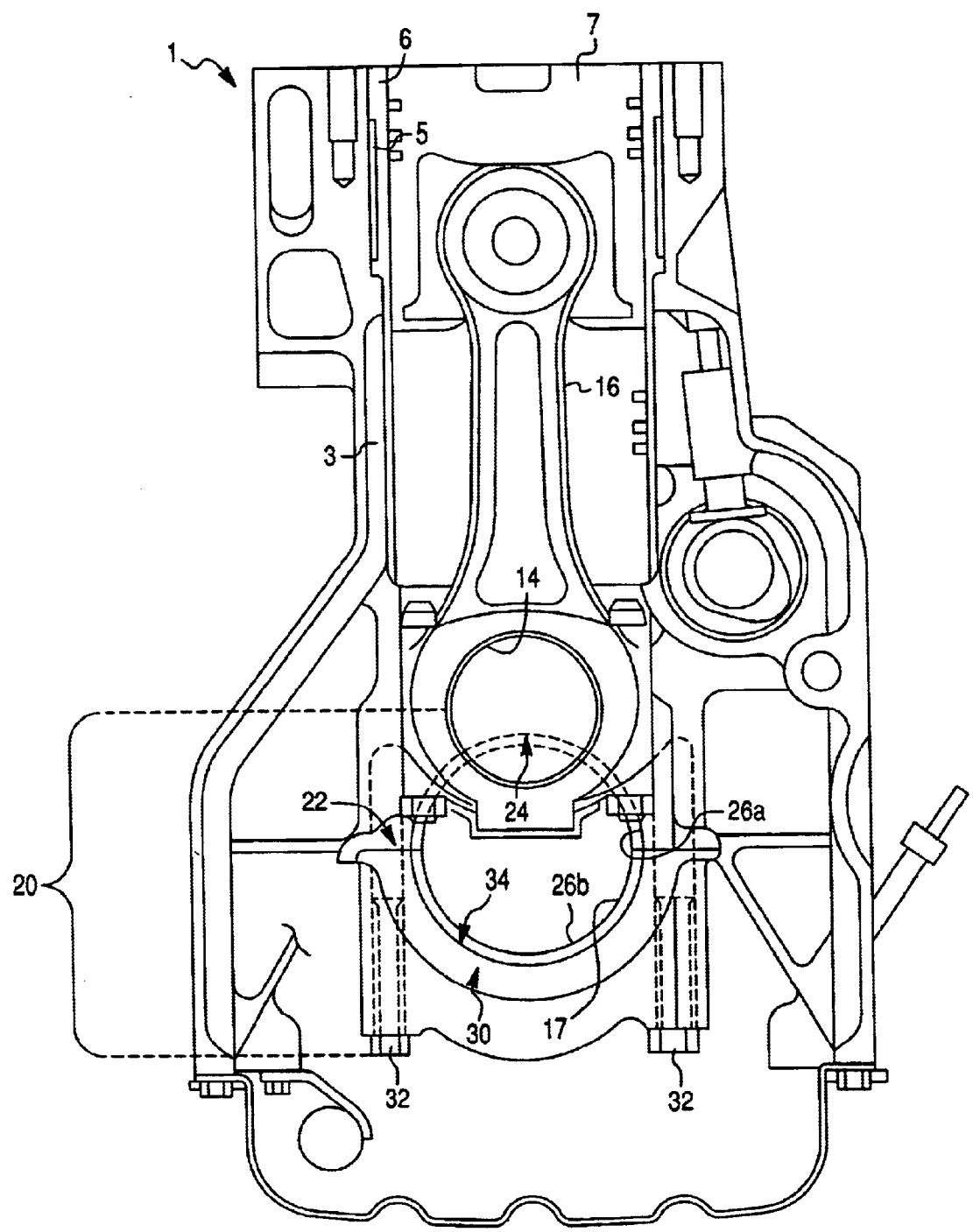
FIG. 2 is a cross sectional view of the internal combustion engine of the present invention.

FIGS. 1 and 2 of the drawings illustrate the exemplary embodiment of an internal combustion engine (IC engine), generally designated with the reference numeral 1, provided with a vibration dampener of the present invention.

With the reference to FIGS. 1 and 2, wherein like numerals designate like components throughout all the several figures, the internal combustion engine 1 includes a cylinder block 3 having a plurality of cylinder bores 5 for receiving a piston (not shown) which reciprocates therein. The IC engine 1 further includes a crankshaft 10 having a plurality of rod journals 12 which are rotatably mounted by connecting rod bearings 14 to lower ends of connecting rods 16. It will be appreciated by those skilled in the art that while only four rod journals 12 and only three cylinder bores 5 are illustrated in FIG. 1, the IC engine 1 may include any appropriate number of cylinders, such as one, two, three, etc., and may be of in-line engine as well as V-engine or opposed-cylinder engine configuration.

The crankshaft 10 further includes a plurality of main journals 18 adapted for rotatably supporting the crankshaft 10 by the cylinder block 3 of the IC engine 1. The crankshaft 10 converts the reciprocating motion of the pistons 7 into rotary motion in a manner well known in the mechanical arts. In order to help balance the radial forces which the connecting rod 16 apply to main journals 18 through the rod journals 12, the crankshaft 10 includes a series of counterweights 19 as shown.

Figure 3:
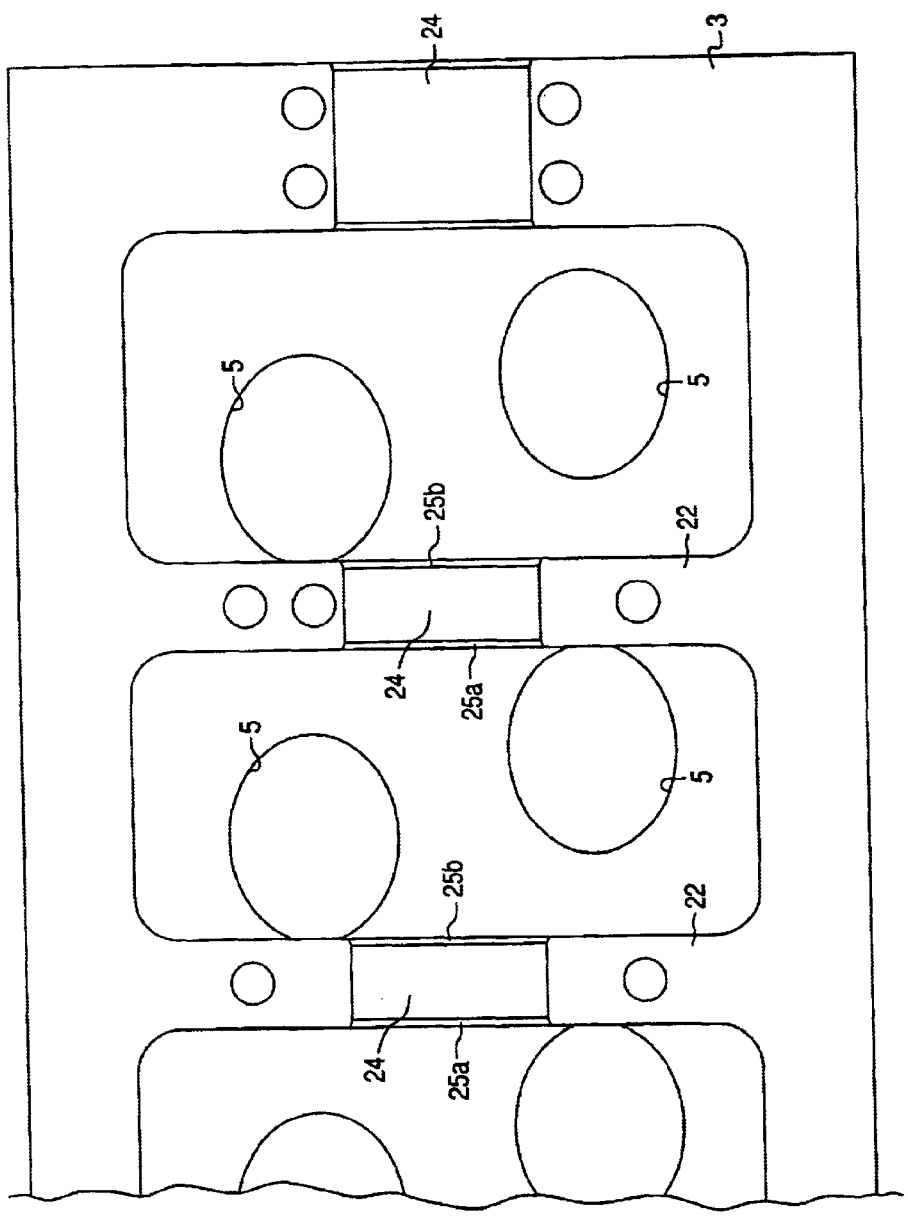
FIG. 3 is a bottom view of a cylinder block of the internal combustion engine with removed main bearing caps in accordance with the preferred exemplary embodiment of the present invention.
Figure 4:
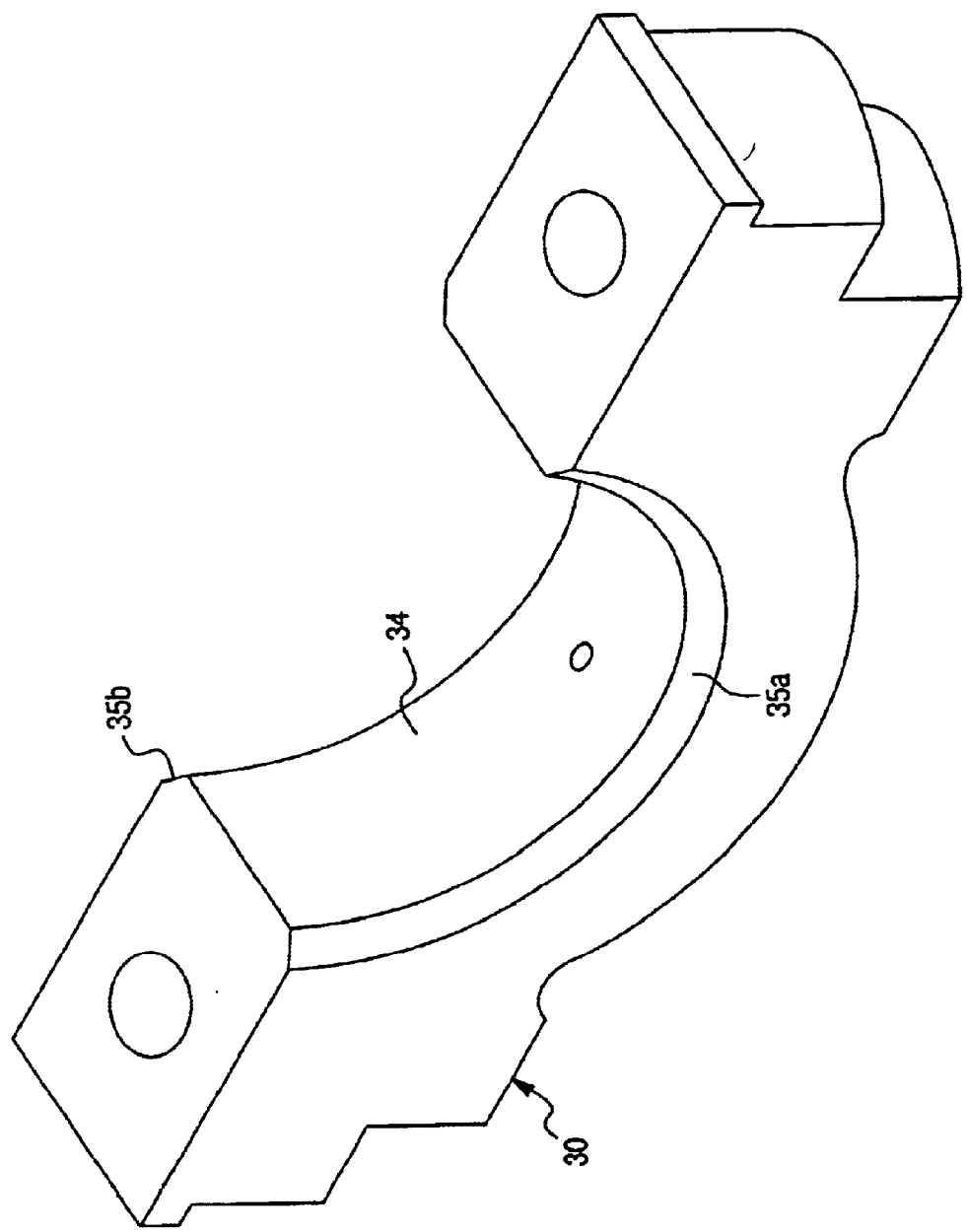
FIG. 4 is a perspective view of a main bearing cap according to the preferred exemplary embodiment of the present invention.

As illustrated in FIGS. 1–2, he cylinder block 3 further includes a plurality of crankshaft support members 20 each comprising a main bearing block 22, which may be integrally formed within the cylinder block 3, and a main bearing cap 30. The main bearing cap 30 is connected to the corresponding main bearing block 22 by any suitable means well known in the art, such as threaded bolts 32, to circumscribe the main journal 18 of the crankshaft through semi-cylindrical main bearings 26a and 26b. As further illustrated in FIGS. 1–3, the main bearing block 22 includes a centrally disposed, semi-cylindrical inner wall 24 adapted for receiving a semi-cylindrical bearing shell 26a which, in turn, receives the upper half of the main journal 18 of the crankshaft 10. As further illustrated in FIGS. 1–3, the semi-cylindrical inner wall 24 of the main bearing block 22 is disposed between axially opposite chamfered ends 25a and 25b. Similarly, as illustrated in FIGS. 1, 2 and 4, the main bearing cap 30 includes a substantially semi-cylindrical inner wall 34 substantially symmetrical to the previously discussed semi-cylindrical inner wall 24 of the main bearing block 22. Each of the crankshaft support members 20 has a main bore 17 defined by the inner wall 24 of the main bearing blocks 22 and the complementary inner wall 34 of the main bearing cap 30, as shown in FIG. 2. As further illustrated in detail in FIGS. 4 and 5, the semi-cylindrical inner wall 34 of the main bearing cap 30 is disposed between axially opposite chamfered ends 35a and 35b.

Figure 7:
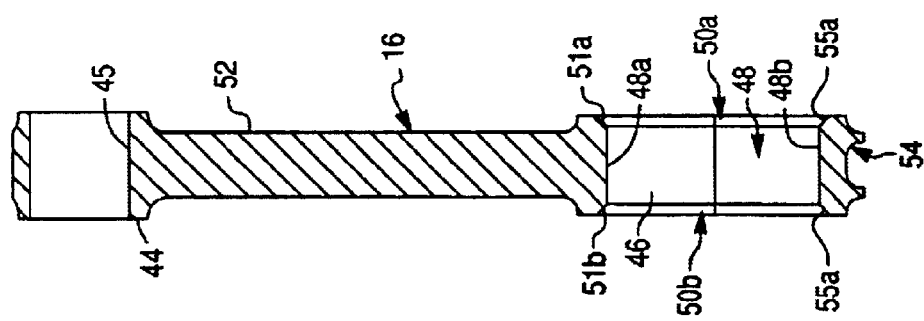
FIG. 7 is a cross sectional view of the assembled connecting rod according to the preferred exemplary embodiment of the present invention.
Figure 6:
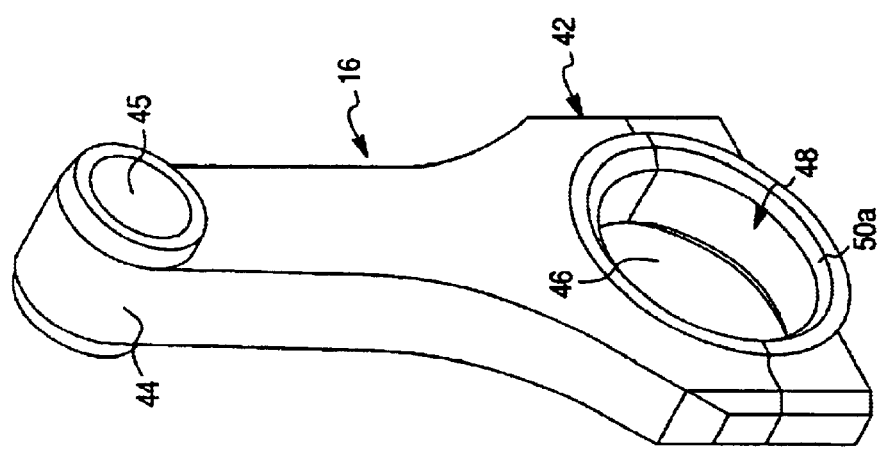
FIG. 6 is a perspective view of an assembled connecting rod according to the preferred exemplary embodiment of the present invention.
Figure 8:
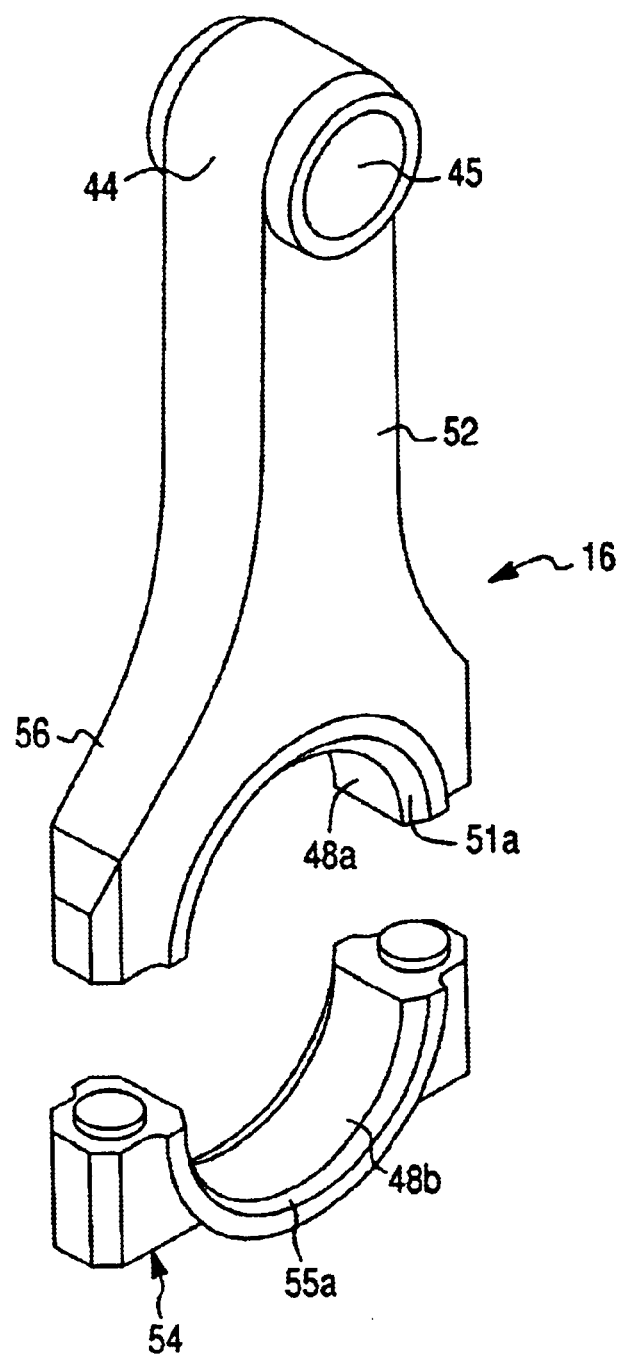
FIG. 8 is an exploded perspective view of the connecting rod in accordance with the preferred exemplary embodiment of the present invention.

As illustrated in FIGS. 6–8, the connecting rod 16 in accordance with the present invention, has a split first end 42 adapted for holding the rod journal 12 of the crankshaft 10 and the connecting rod bearings 14, and a second end 44 defining a pin opening 45 provided to receive a piston pin (as shown in FIG. 2). The first end 42 has a crank bore 46 adapted for receiving the rod journal 12 of the crankshaft 10 and the connecting rod bearings 14, and defined by an annular, substantially cylindrical inner wall 48. The cylindrical inner wall 48 of the first end 42 of the connecting rod 16 is disposed between axially opposite chamfered ends 50a and 50b.

As further illustrated in FIGS. 6–8, the connecting rod 16 comprises a connecting rod shank 52 and a bearing cap 54 connected to the connecting rod shank 52 by any suitable means well known in the art, such as threaded bolt connection, to circumscribe the rod journal 12 of the crankshaft 10. The connecting rod shank 52 includes a first end portion 56 having a substantially semi-cylindrical inner wall 48a disposed between axially opposite chamfered ends 51a and 51b. The bearing cap 54, in turn, has a substantially semi-cylindrical inner wall 48b disposed between axially opposite chamfered ends 55a and 55b and adapted to cooperate with the semi-cylindrical inner wall 48a of the first end portion 56 of the connecting rod shank 52 to define the crank bore 46 of the connecting rod 16 (as shown in FIG. 7).

In order to effectively reduce and eliminate the transmission of vibrations (including harmonics) from the connecting rod to the crankshaft and/or from the crankshaft to the cylinder block, a vibration dampener assembly is mounted directly to each of the connecting rods 16 and each of the rod journals 12 of the crankshaft 10 and/or to each of the main journals 18 of the crankshaft 10 and the cylinder block 3.

Figure 9:
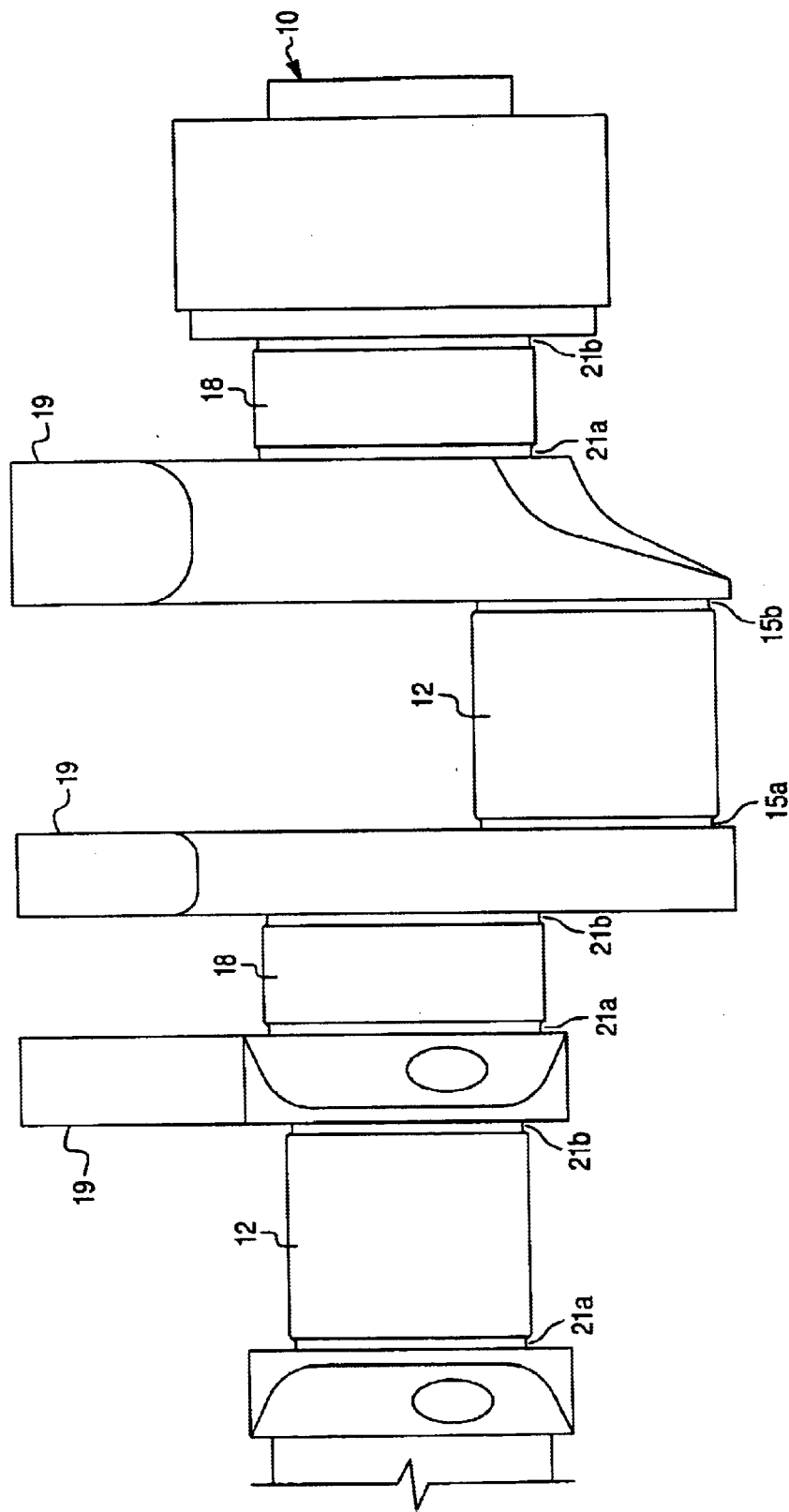
FIG. 9 is a partial sectional view of a crankshaft of the internal combustion engine in accordance with the preferred exemplary embodiment of the present invention.
Figure 10:
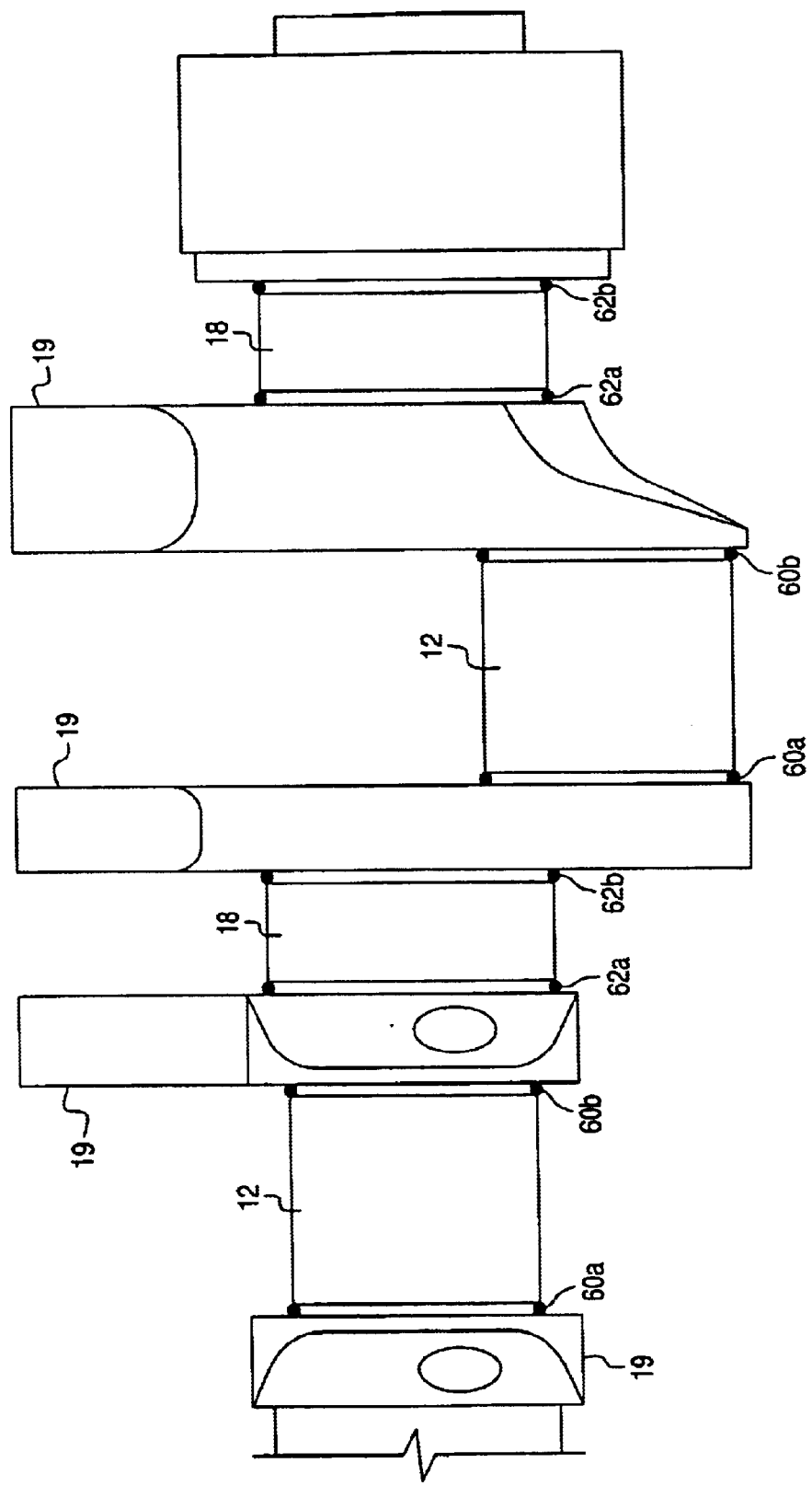
FIG. 10 is a partial sectional view of the crankshaft of the internal combustion engine with annular vibration dampener members mounted thereon in accordance with the preferred exemplary embodiment of the present invention.
Figure 11:
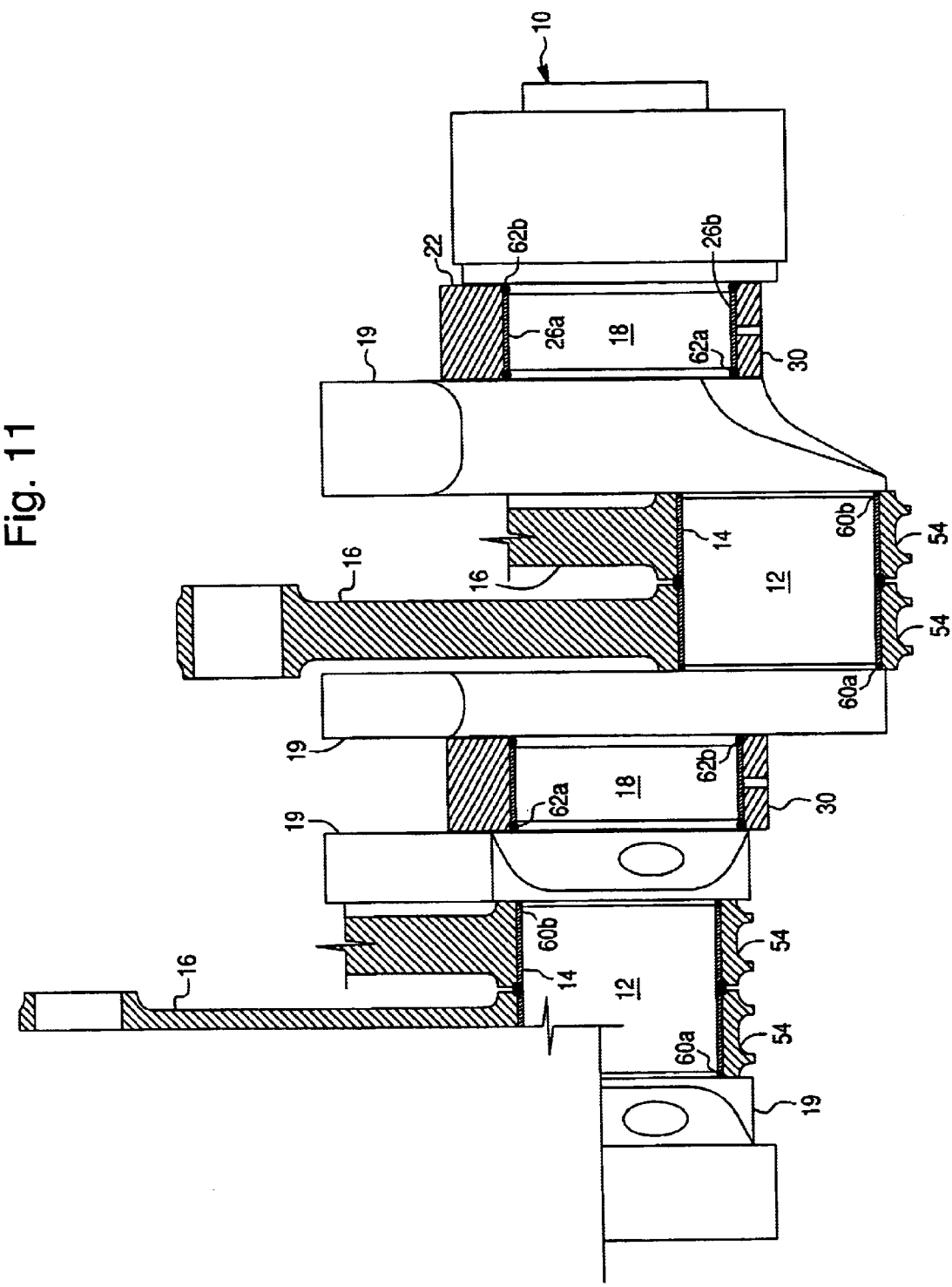
FIG. 11 is a partial cross sectional view of the internal combustion engine according to the preferred exemplary embodiment of the present invention.

As illustrated in detail in FIGS. 9–11, the vibration dampener assembly in accordance with the preferred exemplary embodiment of the present invention comprises a pair of axially spaced, substantially annular recessed portions 15a and 15b formed in an outer peripheral surface of each of the rod journals 12 of the crankshaft 10, a pair of axially spaced, substantially annular recessed portions 21a and 21b formed in the outer peripheral surface of each of the main journal 18 of the crankshaft 10, and a plurality of a pair of complementary, substantially annular vibration dampener members 60a, 60b and 62a, 62b (shown in FIG. 1) each pair disposed in the corresponding, annular recessed portions 15a, 15b formed in the journal bearings 12 and 21a, 21b formed in the main bearings 18 of the crankshaft 10 respectively, for thereby dampening a transmission of vibrations between the crankshaft and the connecting rods and between the crankshaft and the cylinder block. It will be appreciated by those skilled in the art that any appropriate number of the annular vibration dampener members may be mounted to the rod journals and the main journals of the crankshaft, such as one, three, four, etc. Preferably, as illustrated in detail in FIG. 9, the annular recessed portions 15a and 15b are formed on the axially opposite end sides of the rod journal 12 adjacent to the counterweights 19. Similarly preferably, the annular recessed portions 21a and 21b are formed on the axially opposite end sides of the main journal 18 adjacent to the counterweights 19. It will be appreciated by those skilled in the art that alternatively the annular recessed portions 15a and 15b may be formed anywhere between the axially opposite end sides of the rod journal 12, and the annular recessed portions 21a and 21b may be formed anywhere between the axially opposite end sides of the main journal 18.

Further preferably, as illustrated in detail in FIGS. 10 and 11, the vibration dampener members 60a and 60b slightly extend from the recessed portions 15a and 15b in the rod journals 12 of the crankshaft 10 so that the vibration dampener members 60a and 60b are in contact and somewhat compressed by the chamfered ends 51a and 51b of the connecting rod shank 52 and the chamfered ends 55a and 55b of the connecting rod bearing cap 54, thus significantly dampening a transmission of vibrations from the connecting rod 16 to the crankshaft 10, as illustrated in FIG. 11.

Similarly preferably, the vibration dampener members 62a and 62b slightly extend from the recessed portions 21a and 21b in the main journals 18 of the crankshaft 10 so that the vibration dampener members 62a and 62b are in contact and somewhat compressed by the chamfered ends 25a and 25b of the main bearing block 22 and the chamfered portions 35a and 35b of the main bearing cap 30, thus significantly dampening a transmission of vibrations from the crankshaft 10 to the cylinder block 3, as illustrated in FIG. 11.

Further preferably, each of the annular vibration dampener members 60a, 60b and 62a, 62b is in the form of an O-ring-like member having a substantially circular cross-section. Correspondingly, the annular recessed portions 15a and 15b formed in the outer peripheral surface of each of the rod journals 12 and the annular recessed portions 21a and 21b formed in the outer peripheral surface of each of the main journal 18 of the crankshaft 10 have substantially semi-circular cross-sections substantially complementary to the cross-sections of the vibration dampener members 60a, 60b and 62a, 62b. It will be appreciated by those skilled in the art that the semi-annular recessed portions 15a, 15b and 21a, 21b and the vibration dampener members 60a, 60b and 62a, 62b may alternatively have any other appropriate cross-sections, such as substantially rectangular, oval, etc. Preferably, the vibration dampener members 60a, 60b and 62a, 62b are made of a slippery elastomeric oil resistant rubber-like material. However, other vibration absorbent material may be used such as oil resistant elastomeric plastic or other synthetic materials.

Moreover, previously manufactured internal combustion engines having conventional crankshafts, may be easily retrofitted with the crankshafts of the present invention in order to isolate vibrations between the connecting rods and the crankshaft and between the crankshaft and the cylinder block, and prevent/reduce vibrations from being transmitted to the crankshaft and consequently to the remaining portions of the drive train assembly.

Therefore, a crankshaft for an internal combustion engine in accordance with the present invention represents a novel arrangement of the crankshaft provided with an annular vibration dampener members disposed between the crankshaft and the connecting rod and/or cylinder block. Combining a vibration dampener member between the connecting rod and the crankshaft and/or between the crankshaft and the cylinder block has demonstrated a substantial reduction in vibrations transmitting through the entire engine and power train assembly.

Moreover, those skilled in the art will also understand that the crankshaft of the present invention can be used in many different types of mechanisms, other than the internal combustion engines, employing the connecting rod/crankshaft combination, such as piston pumps, pneumatic or hydraulic piston actuators, etc.

The foregoing description of the preferred exemplary embodiments of the present invention has been presented for the purpose of illustration in accordance with the provisions of the Patent Statutes. It is not intended to be exhaustive or to limit the invention to the precise forms disclosed. Obvious modifications or variations are possible in light of the above teachings. The embodiments disclosed hereinabove were chosen in order to best illustrate the principles of the present invention and its practical application to thereby enable those of ordinary skill in the art to best utilize the invention in various embodiments and with various modifications as are suited to the particular use contemplated, as long as the principles described herein are followed. Thus, changes can be made in the above-described invention without departing from the intent and scope thereof. It is also intended that the scope of the present invention be defined by the claims appended thereto.

What is claimed is:

1. A crankshaft comprising:
   at least one rod journal provided for rotatably connecting said crankshaft to a connecting rod;
   at least one main journal disposed within at least one bearing bore of a cylinder block for rotatably supporting said crankshaft by said cylinder block; and
   a vibration dampener assembly comprising at least one substantially annular vibration dampener member mounted directly to one of said at least one rod journal and said at least one main journal of said crankshaft thereby dampening a transmission of vibrations between said crankshaft and one of said connecting rod and said cylinder block.

2. A crankshaft comprising:
   at least one rod journal provided for rotatable connecting said crankshaft to a connecting rod;
   at least one main journal disposed within at least one bearing bore of a cylinder block for rotatable supporting said crankshaft by said cylinder block; and
   a vibration dampener assembly comprising at least one substantially annular vibration dampener member mounted directly to one of said at least one rod journal and said at least one main journal of said crankshaft thereby dampening a transmission of vibrations between said crankshaft and one of said connecting rod and said cylinder block,
   wherein said vibration dampener assembly further includes at least one substantially annular recessed portion formed in an outer peripheral surface of one of said at least one rod journal and said at least one main journal, and wherein said at least one annular recessed portion is provided to receive said at least one annular vibration dampener member.

3. The crankshaft as defined in claim 2, wherein said vibration dampener assembly includes two substantially annular axially spaced recessed portions formed in said outer peripheral surface of one of said at least one rod journal and said at least one main journal and two substantially annular vibration dampener members, and wherein each of said two annular recessed portions is provided to receive one of said two annular vibration dampener members.

4. The crankshaft as defined in claim 3, wherein said two substantially annular recessed portions are formed on axially opposite end sides of said outer peripheral surface of one of said at least one rod journal and said at least one main journal.

5. The crankshaft as defined in claim 2, wherein said at least one vibration dampener member is an O-ring made of an elastomeric material.

6. The crankshaft as defined in claim 5, wherein said O-ring is made of an oil resistant elastomeric rubber-like material.

7. The crankshaft as defined in claim 5, wherein said O-ring has a substantially circular cross-section.

8. The crankshaft as defined in claim 7, wherein said at least one substantially annular recessed portion formed in said outer peripheral surface of one of said at least one rod journal and said at least one main journal has a substantially semi-circular cross-section substantially complementary to said circular cross-section of said at least one vibration dampener member.

9. The internal combustion engine as defined in claim 2, wherein said at least one annular vibration dampener member slightly extends from said at least one recessed portion so that said at least one vibration dampener member is in contact and somewhat compressed by said cylindrical inner wall of said bore in said at least one coupling member.

10. An internal combustion engine comprising:
    a crankshaft having at least one rod journal and at least one main journal;
    a cylinder block rotatably supporting said crankshaft;
    at least one coupling member rotatably coupled to said crankshaft;
    said at least one coupling member having an annular, substantially cylindrical inner wall defining a bore circumscribing one of said at least one main journal and said at least one rod journal of said crankshaft;
    a vibration dampener assembly comprising at least one substantially annular vibration dampener member mounted directly to one of said at least one rod journal and said at least one main journal of said crankshaft thereby dampening a transmission of vibrations between said crankshaft and one of said connecting rod and said cylinder block.

11. An internal combustion engine comprising:
    a crankshaft having at least one rod journal and at least one main journal;
    a cylinder block rotatable supporting said crankshaft:
    at least one coupling member rotatable coupled to said crankshaft; said at least one coupling member having an annular, substantially cylindrical inner wall defining a bore circumscribing one of said at least one main journal and said at least one rod journal of said crankshaft;
    a vibration dampener assembly comprising at least one substantially annular vibration dampener member mounted directly to one of said at least one rod journal and said at least one main journal of said crankshaft thereby dampening a transmission of vibrations between said crankshaft and one of said connecting rod and said cylinder block,
    wherein said vibration dampener assembly further includes at least one substantially annular recessed portion formed in an outer peripheral surface of one of said at least one rod journal and said at least one main journal, and wherein said at least one annular recessed portion is provided to receive said at least one annular vibration dampener member.

12. The internal combustion engine as defined in claim 11, wherein said vibration dampener assembly includes two substantially annular vibration dampener members and two substantially annular axially spaced recessed portions formed in said outer peripheral surface of one of said at least one rod journal and said at least one main journal and two substantially annular vibration dampener members, and wherein each of said two annular recessed portions is provided to receive one of said two annular vibration dampener members.

13. The internal combustion engine as defined in claim 12, wherein said two substantially annular recessed portions are formed on axially opposite end sides of said outer peripheral surface of one of said at least one rod journal and said at least one main journal.

14. An internal combustion engine comprising:
    a crankshaft having at least one rod journal and at least one main journal;
    a cylinder block rotatably supporting said crankshaft;
    at least one coupling member rotatably coupled to said crankshaft; said at least one coupling member having an annular, substantially cylindrical inner wall defining a bore circumscribing one of said at least one main journal and said at least one rod journal of said crankshaft;

a vibration dampener assembly comprising at least one substantially annular vibration dampener member mounted directly to one of said at least one rod journal and said at least one main journal of said crankshaft thereby dampening a transmission of vibrations between said crankshaft and one of said connecting rod and said cylinder block, wherein said at least one vibration dampener member is an O-ring made of an elastomeric material.

15. The internal combustion engine as defined in claim 14, wherein said O-ring is made of an oil resistant elastomeric rubber-like material.

16. The internal combustion engine as defined in claim 11, wherein said at least one annular vibration dampener member slightly extends from said at least one recessed portion so that said at least one vibration dampener member is in contact and somewhat compressed by said cylindrical inner wall of said bore in said at least one coupling member.

17. The internal combustion engine as defined in claim 12, wherein said bore in said at least one coupling member has opposite chamfered ends, and wherein each of said two annular vibration dampener members slightly extends from corresponding one of said two recessed portions so that each of said vibration dampener members is in contact and somewhat compressed by one of said chamfered ends of said bore in said at least one coupling member.

18. An internal combustion engine comprising:

a crankshaft having at least one rod journal and at least one main journal;

a cylinder block rotatably supporting said crankshaft;

at least one coupling member rotatable coupled to said crankshaft; said at least one coupling member having an annular, substantially cylindrical inner wall defining a bore circumscribing one of said at least one main journal and said at least one rod journal of said crankshaft;

a vibration dampener assembly comprising at least one substantially annular vibration dampener member mounted directly to one of said at least one rod journal and said at least one main journal of said crankshaft thereby dampening a transmission of vibrations between said crankshaft and one of said connecting rod and said cylinder block, wherein said at least one coupling member is a connecting rod comprising a connecting rod shank and a bearing cap secured to said connecting rod shank, each of said connecting rod shank and said bearing cap having at least one substantially semi-annular inner surface complementary to each other and together defining a substantially annular crank bore circumscribing said at least one rod journal of said crankshaft, said annular crank bore of said connecting rod having axially opposite chamfered ends.

19. The internal combustion engine as defined in claim 18, wherein said vibration dampener assembly includes two substantially annular vibration dampener members and two substantially annular axially spaced recessed portions formed on axially opposite end sides of said outer peripheral surface of said at least one rod journal and two substantially annular vibration dampener members, and wherein each of said two annular recessed portions is provided to receive one of said two annular vibration dampener members, and wherein each of said two annular vibration dampener members slightly extends from corresponding one of said two recessed portions so that each of said vibration dampener members is in contact and somewhat compressed by one of said chamfered ends of said crank bore in said connecting rod.

20. An internal combustion engine comprising:

a crankshaft having at least one rod journal and at least one main journal;

a cylinder block rotatably supporting said crankshaft;

at least one coupling member rotatable coupled to said crankshaft; said at least one coupling member having an annular, substantially cylindrical inner wall defining a bore circumscribing one of said at least one main journal and said at least one rod journal of said crankshaft;

a vibration dampener assembly comprising at least one substantially annular vibration dampener member mounted directly to one of said at least one rod journal and said at least one main journal of said crankshaft thereby dampening a transmission of vibrations between said crankshaft and one of said connecting rod and said cylinder block, wherein said at least one coupling member is a crankshaft support member comprising a main bearing portion attached to said engine block and a main bearing cap secured to said main bearing portion, each of said main bearing portion and said main bearing cap having at least one substantially semi-annular recessed portion complementary to each other and together defining a substantially annular main bore circumscribing said at least one main journal of said crankshaft, said annular main bore of said crankshaft support member having axially opposite chamfered ends.

21. The internal combustion engine as defined in claim 20, wherein said vibration dampener assembly includes two substantially annular vibration dampener members and two substantially annular axially spaced recessed portions formed on axially opposite end sides of said outer peripheral surface of said at least one main journal and two substantially annular vibration dampener members, and wherein each of said two annular recessed portions is provided to receive one of said two annular vibration dampener members, and wherein each of said two annular vibration dampener members slightly extends from corresponding one of said two recessed portions so that each of said vibration dampener members is in contact and somewhat compressed by one of said chamfered ends of said main bore in said crankshaft support member.

* * * * *